3,386,955
SUBSTITUTED UREAS AS LOW TEMPERATURE EPOXY CURING AGENTS

Aleksandra Chrobok Nawakowski, Fairfield, and Samuel Shan-Ning Wang and Arthur Maurice Schiller, Stamford, Conn., assignors to American Cyanamid Company, Stamford, Conn., a corporation of Maine
No Drawing. Filed Jan. 14, 1966, Ser. No. 520,630
4 Claims. (Cl. 260—47)

This invention relates, in general, to certain novel and useful epoxide curing agents and to certain novel polyepoxide curable adhesive compositions containing these agents. In particular, our invention concerns in one aspect the preparation and use of a new and improved bis-urea curing agent which is quite active at low temperatures. In a second aspect, our invention concerns the preparation and use of an improved thermosetting epoxy resinous adhesive which may be cured rapidly at moderate curing temperatures yet demonstrates exceptionally good storage stability.

Polyepoxide containing compositions formulated with various curing agents have won wide acclaim as adhesive materials for bonding metals, particularly aluminum fabricated structural elements. The strength and hardness of the bond created by polyepoxides has made them a favored bonding agent in the aircraft industry where reliability, thermal stability, and ease of handling are of paramount importance in the manufacture of airframes for aircraft as well as airspace and missile vehicles of various types.

At the present time and prior to the present discovery, the most commonly employed curing agents for such polyepoxide adhesive compositions are either dicyandiamide or various amines such as ethylene diamine or other polyamines such as propylene diamine or diethylene triamine. However, as regards dicyandiamide and acid anhydrides thereof, they suffer a serious disadvantage in that they require a high temperature cure of the order of 325°–350° F. to effect a satisfactory bond between the structural elements being bonded together. This deficiency has a particularly adverse effect on the use of polyepoxide adhesives employing this curing system in the aerospace and missile manufacturing industry where structural aluminum honeycomb or fabricated aluminum segments are joined as aerospace vehicle components. At the adhesive cure temperatures noted above, the aluminum segments involved are degraded structurally by metal fatigue due to crystallization. As to the latter group of curing agents while they perform satisfactorily at lowered temperatures, they suffer from a lack of stability under storage conditions and in most instances, must be used within 24 hours after formulation of the epoxide component with the curing agent or else the mixture beings to cure or set under normal conditions of storage. When such an event occurs, the adhesive composition is useless for all intents and purposes, because it can no longer be handled and moreover, once it has partially cured its adhesive strength or "bond strength" as it is referred to is greatly diminished.

From the foregoing, it would appear that a polyepoxide resin composition capable of being easily handled and cured at slightly elevated temperatures would be of great value to the adhesives art, particularly if the said composition had protracted shelf life and stability prior to use. It is a primary object of this invention to disclose to the art such a composition of matter having just these beneficial attributes. The proof of the value of this discovery will be further demonstrated from evidence collected upon testing of these compositions in actual use to confirm the existence of the beneficial attributes postulated for the material.

The discovery which affords the basis for our invention may be succinctly stated as residing in the dual concept of a novel epoxy type adhesive composition comprising a major amount of a polyepoxide partially cured resin and a relatively minor, but effective quantity of a certain novel and unique curing agent for said curable epoxide material. The novel curing agent component comprises a substituted bis-urea which, while it is more specifically detailed in the following examples, may be generically illustrated by the following graphic representation:

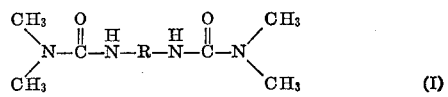
(I)

wherein R represents a divalent aromatic radical selected from the group consisting of unsubstituted phenylene, methyl substituted phenylene, dimethyl diphenylene, and methylene diphenylene.

In the above definition, the term "methyl substituted phenylene" employed, is intended to refer to the substitution of the phenyl ring in either an ortho, meta or para substitution thereof. It is, of course, to be understood that the isocyanate functions on the divalent aromatic radical moiety of the molecule may be arranged in more than one isomeric form and in fact, may be mixtures of two or three isomers. For example, a preferred species of our novel class of curing agents is the reaction product of dimethylamine with a mixture of the 2,4- and 2,6-tolylene diisocyanates to yield a final bis-urea reaction product having a mixed isomeric configuration. The most preferred species of our class of bis-urea curing agents at present, however, is the compound 1,1'-(4-methyl-m-phenylene)-bis-[3,3-dimethylurea] which in the preferred practice of the present invention permits the preparation of improved polyepoxide-curing agent adhesive compositions which will, in all cases be stable against premature condensation for at least one month after formulation, yet capable of cure to a hard thermoset bond at 86–107° C. in about 90 minutes' cure time.

The polyepoxide-containing compositions which can be cured using my novel catalysts comprise organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g., hydroxy groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodohydrin, and the like, with either a polyhydric phenol or a polyhydric alcohol.

Among the polyhydric phenols which can be used in preparing these resinous epoxy polyethers are dihydric phenols represented by the general formula:

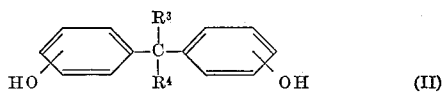

(II)

wherein the phenolic hydroxy groups may be in any of the 2,2'; 2,3'; 2,4'; 3,3'; 3,4' or 4,4' positions on the aromatic nuclei, and each of $R^3$ and $R^4$ represent hydrogen, an alkyl group, such as methyl, ethyl, propyl, isopropyl, butyl, sec-butyl, tert-butyl, pentyl, isopentyl, hexyl, isohexyl, and the like; a cyclo(lower)-alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl groups, for example lower alkyl groups containing from 1 to 4 carbon atoms, i.e., methyl, ethyl, propyl, isopropyl, butyl, sec-butyl and tert-butyl groups, halogen atoms, i.e., fluorine, chlorine, bromine or iodine, and the like.

An illustrative but, by no means exhaustive listing of dihydric phenols falling within this general formula includes 4,4'-dihydroxydiphenyldimethylmethane (bisphenol A), 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane, and the like.

Other polyhydric phenols which may also be co-reacted with an epihalohydrin to provide these resinous epoxy polyethers are such compounds as resorcinol, hydroquinone, substituted hydroquinones, e.g., p-tert-butylhydroquinone, and the like, indanols such as those disclosed in U.S. Patent No. 2,754,285 to Petropoulos, and polyhydric phenols having two hydroxy aryl groups separated by an aliphatic chain of at least six carbon atoms in length, said chain being attached by carbon-to-carbon bonding to nuclear carbon atoms of the hydroxyaryl groups. Members of this latter class of polyhydric phenols can be conveniently obtained by condensing phenol itself with a phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2,2',3,3'-tetrahydroxydipropyl sulfide and the like, mercapto alcohols such as α-monothioglycerol, α,α'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

When preparing these resinous epoxy polyethers from an epihalohydrin and a polyhydric phenol, the reaction will preferably be carried out in the presence of an amount of an alkaline material, e.g., sodium hydroxide or potassium hydroxide, sufficient to combine with the halogen released by the epihalohydrin during the course of the reaction. The amount of epihalohydrin used is generally in excess of the stoichiometric quantity required for reaction with the epihalohydrin. In addition, the reaction will preferably be carried out at a temperature ranging from about 50° C. to about 150° C., usually for periods of time ranging up to several hours.

When reacting an epihalohydrin with a polyhydric alcohol, the reaction is preferably carried out in the presence of an acid-acting material, e.g., hydrofluoric acid or a boron trifluoride-ether complex, and the resulting halohydrin product is then dehydrohalogenated in the presence of an alkaline material.

The resulting resinous reaction products may contain free terminal hydroxyl groups or terminal hydroxyl groups and terminal epoxy groups, and will vary in molecular weight depending on the reactants employed, the relative amounts thereof, and the extent to which the reaction is carried out. These thermosetting epoxy resinous materials are generally soluble in solvents such as acetone, methyl ethyl ketone, methyl isobutyl ketone, cyclohexanone, and the like.

A related class of polymeric polyepoxides which can be catalyzed according to the practice of the present invention comprises the polyepoxypolyhydroxy polyethers obtained by reacting, again preferably in alkaline medium a polyhydric phenol such as bisphenol A, resorcinol, catechol and the like, or a polyhydric alcohol such as glycerol, sorbitol, pentaerythritol and the like, with a polyepoxide such as bis(2,3-epoxypropyl)ether, bis(2,3-epoxy-2-methylpropyl)ether, 1,2-epoxy-4,5-epoxypentane and the like.

Another class of polymeric polyepoxides which can be cured by means of the above-described curing agents includes the epoxy novolac resins obtained by reacting, preferably in the presence of a basic catalyst, e.g., sodium or potassium hydroxide, and epihalohydrin such as epichlorohydrin with the resinous condensate of an aldehyde, e.g., formaldehyde, and either a monohydric phenol, e.g., phenol itself, or a polyhydric phenol, e.g., bisphenol A. A representative number of the epoxy novolac resins obtained by reacting an epihalohydrin with a monohydric phenol-formaldehyde resinous condensate can be represented by the general formula:

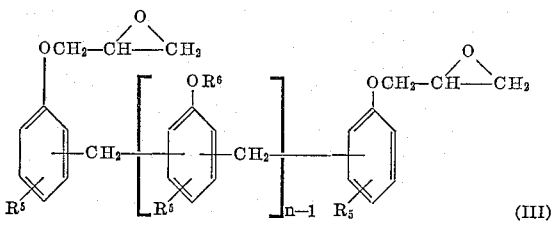

(III)

wherein, for example, $R^5$ represents either hydrogen or a lower alkyl group, such as methyl, ethyl, and the like, $R^6$ represents hydrogen, a halohydrin group, e.g.,

a glycol group, e.g.,

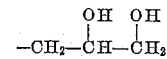

or a glycidyl group, i.e.,

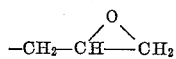

and $n$ is a number of 1 or greater. Similarly, a representative number of the expoxy novolac resins obtained by reacting an epihalohydrin with a polyhydric phenol-formaldehyde resinous condensate can be represented by the general formula:

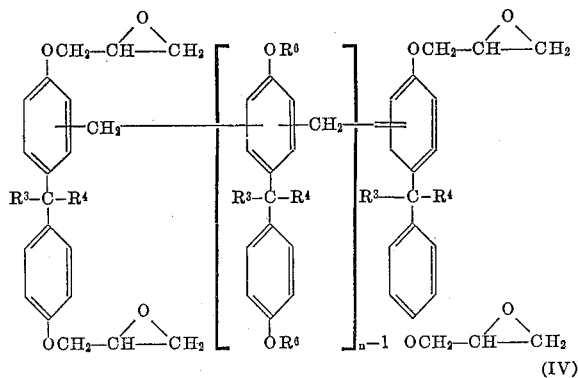

(IV)

wherein $R^3$ and $R^4$ are as defined for Formula II above and $R^6$ and $n$ are as defined for Formula III above. Further details concerning the nature and preparation of these epoxy novolac resins can be obtained in Carswell, T. S., "Phenoplasts" (New York: Interscience Publishers, 1947) page 29 et seq.

Still another class of polymeric polyepoxides which can be catalyzed with the above described curing agents includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Among the monomeric polyepoxides which can be catalyzed according to the practice of the present invention are the di- and triepoxides represented by the general formula:

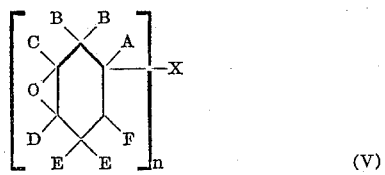

(V)

wherein A through F represent hydrogen or an alkyl group, preferably a lower alkyl group having from 1 to 4 carbon atoms, inclusive, such as methyl, ethyl, propyl, n-butyl and the like, and X represents a divalent radical which can be

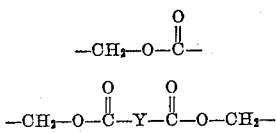

or

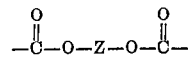

in which case $n$ equals 2, or a trivalent radical which can be

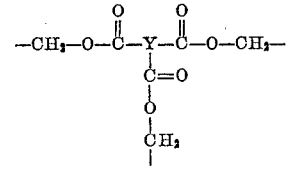

or

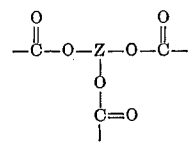

in which case $n$ equals 3, with Y representing an aliphatic or aromatic hydrocarbon radical containing from 2 to 12 carbon atoms, inclusive, and Z representing a lower aliphatic hydrocarbon radical or a lower oxyalkylene group, e.g., -alkylene-O-alkylene- and the like. Included among such di- and triepoxides are 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, bis(3,4 - epoxycyclohexylmethyl)maleate, bis(3,4 - epoxy - 6 - methylcyclohexylmethyl)-succinate, ethylene glycol bis(3,4 - epoxycyclohexanecarboxylate), 2 - ethyl - 1,3 - hexanediol bis(3,4-epoxy-6-methylcyclohexanecarboxylate), tris(3,4 - epoxycyclohexylmethyl) 1,2,4 - hexanetricarboxylate, glyceryl tris(3,4-epoxy-6-methylcyclohexanecarboxylate) and the like.

Other monomeric polyepoxides which can be cured by means of the above described substituted curing agents include dicyclopentadiene dioxide, epoxidized triglycerides such as epoxidized glycerol trioleate, epoxidized glycerol trilinoleate, the diacetate of epoxidized glycerol trilinoleate and the like, 1,8 - bis-(2,3-epoxypropoxy) octane, 1,4 - bis(2,3 - epoxypropoxy)cyclohexane, 1,4-bis(3,4 - epoxybutoxy)-2-chlorocyclohexane, 1,3-bis(2,3-epoxypropoxy)benzene, 1,4 - bis(2,3 - epoxypropoxy) benzene, 1,3 - bis(2 - hydroxy-3,4-epoxybutoxy)benzene, 1,4 - bis(2 - hydroxy - 4,5 - epoxypentoxy)benzene, 1,3-bis(4,5-epoxypentoxy) - 5 - chlorobenzene, 4,4'-bis(2,3-epoxypropoxy)diphenyl ether, and epoxy ethers of polybasic acids such as diglycidyl succiniate, diglycidyl adipate, diglycidyl maleate, diglycidyl phthalate, diglycidyl hexachloroendomethylenetetrahydrophthalate and diglycidyl 4,4'-isopropylidenedibenzoate, and the like.

Many of these polyepoxides, and particularly those which are polymeric, can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups dehydrated or otherwise reacted.

It will be appreciated by those skilled in the art that the catalyzed polyepoxide-containing compositions which can be prepared according to the practice of the present invention are not limited to those containing the above described polyepoxides, but that said polyepoxides are to be considered merely as being representative of the class of polyepoxides as a whole. Further details concerning the nature and preparation of the above described polyoxides can be found in U.S. Patents Nos. 2,633,458; 2,872,427 and 2,884,408, among others, which are incorporated herein by reference.

The resulting catalyzed polyepoxide-containing compositions can be used in any of the applications for which polyepoxides are customarily used, e.g., as adhesives, impregnants, surface coatings, potting and encapsulating compisitions, in laminates, and particularly, as adhesives for bonding metallic elements or structures together.

Various conventionally employed additives can be admixed with these novel bis-urea type low temperature catalyzed polyepoxide-containing compositions prior to final cure. For example, in certain instances, it may be desired to add minor amounts of co-catalysts or hardeners along with our novel curing agents. Conventional pigments, dyes, fillers, flameretarding agents and other compatible natural and synthetic resins can also be added. Furthermore, known solvents for the polyepoxide materials, such as acetone, methyl ethyl ketone, toluene, benzene, xylene, dioxane, methyl isobutyl ketone, dimethylformamide, Cellosolve acetate and the like can be used if desired and where necessary.

The quantity of bis-urea curing agent employed in our adhesive formulation is not critical to the successful operation thereof. Normally a quantity of from 1 to 20 parts by weight of the total composition will be the curing agent to each 100 parts by weight of the epoxide component. For practical and economic considerations, a range of 3 to 5 parts of the curing agent per 100 parts of epoxide is preferred.

The following examples illustrate the inventive aspects of our invention in their respective concrete modes of practice. Some of the examples set forth describe the preparation of our novel curing agents "per se" while still other examples describe their formulation into unique adhesive compositions of matter. Following the illustrations of the manufacture of the improved adhesive formulation, a series of factual test results are set forth in tabulated form to illustrate the unexpected benefit derived from our novel compositions when compared with other curing agents of the prior art which have somewhat analogous structural configuration. In all of the several examples, the quantities of reactants and reaction products are expressed in parts by weight, unless otherwise specifically designated. The following examples are intended solely to more precisely explain the nature and function of the invention, not to limit the underlying concept on which these embodiments are based. For a legel definition of the scope of our invention and its concept, one may refer only to the several claims appended hereto.

PREPARATION OF CURING AGENTS

Example 1.—Preparation of 1,1'-(4-methyl-m-phenylene)-bis-[3,3-dimethylurea]

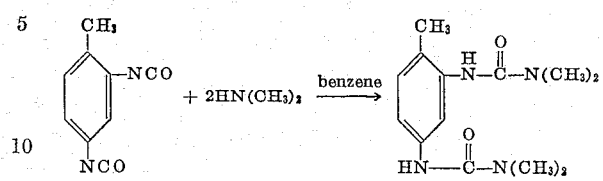

2,4-tolylene diisocyanate (174 parts, 1 mole) was dissolved in 2500 parts of anhydrous benzene. With vigorous stirring, 100 parts of dimethylamine (2.22 moles) was introduced into the flask over a period of one hour. The reaction flask was cooled with a cold water-bath to maintain the reaction temperature at 25–40° C. The condenser was cooled with a circulating ice-water/acetone mixture to avoid loss of dimethylamine vapor (B.P. 7.4° C.). The reaction mixture was stirred for an additional one hour after completing the addition of the amine. The white precipitate was collected by filtration and air-dried in a ventilated hood. The yield of the product is quantitative (264 parts) and the product melted at 178–183° C.

*Analytical.*—Calculated for $C_{13}H_{20}N_4O_2$: N, calc'd: 21.2%. Found: 21.0%.

Example 2.—Preparation of mixed isomers of 1,1'-(4-methyl-m-phenylene)-bis-[3,3-dimethyl urea]

Using the same above procedure, a product was obtained from reacting 2,4- and 2,6-tolylene diisocyanate (80/20) mixed isomer mixture (34.8 parts, 0.2 mole) with dimethylamine (20 parts, 0.45 mole) in benzene solvent (500 parts). The yield was 95% of the theoretical and it fused at 174–176° C. at first and gave a clear melt at 200° C.

*Analytical.*—Calc'd for $C_{13}H_{20}N_4O_2$: N, calc'd: 21.2%. Found: 21.1%.

Examples III–IX

Following the same procedure and the same general type of preparatory reaction as outlined in Example 1 above, the following members of the general class of bis-urea compounds are prepared. The examples of non-functional members of the general class of bis-urea compositions, i.e. close analogues thereof which are not within the scope of this invention are included for purposes of comparison as indicated in every instance by an asterisk "*" after the example number. In this regard, Examples III, VI, VIII and IX are specifically to be noted as comparative examples.

In the interest of brevity, these particular members will be indicated in a tabulated form in Table I below:

TABLE I

| Ex. | Amines | Isocyanate | Product Name and Structure |
|---|---|---|---|
| III* | Diethylamine. $HN(CH_2CH_3)_2$ | 2,4-tolylene diisocyanate. | 1,1'(4-methyl-m-phenylene)-bis[3,3-diethylurea]. |
| IV | Dimethylamine. | 4,4'-diphenylmethane diisocyanate. | 1,1'-(methylenedi-p-phenylene)bis[3,3-di-methylurea]. |

TABLE I—Continued

| Ex. | Amines | Isocyanate | Product Name and Structure |
|---|---|---|---|
| V | Dimethylamine. | Phenylene diisocyanate m, p, and o isomers. 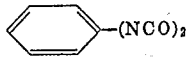 | 1,1'-phenylene bis[3,3-dimethylurea]. 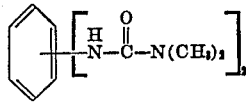 |
| VI* | Dimethylamine. | 3,3'-dimethoxy-4,4'-biphenyl diisocyanate. 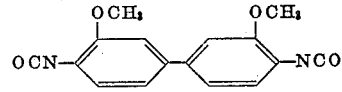 | 1,1'-(3,3'-dimethoxy-4,4'-biphenylene)bis[3,3-dimethyl urea]. 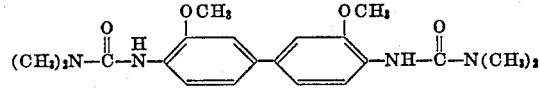 |
| VII | Dimethylamine. | 3,3'-dimethyl-4,4'-biphenyl diisocyanate. 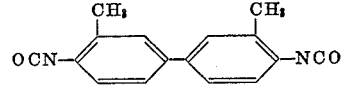 | 1,1'-(3,3'-dimethyl-4,4'-biphenylene)bis[3,3-dimethylurea]. 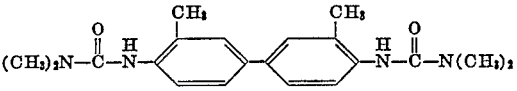 |
| VIII* | Ethyleneimine. 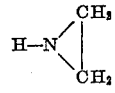 | 2,4-tolylene diisocyanate. 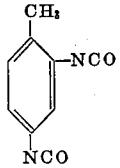 | 1,1'-(4-methyl-m-phenylene)-bis[3,3-aziridinylurea]. 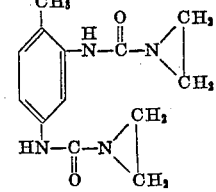 |
| IX* | Piperidine. 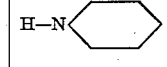 | 2,4-tolylene diisocyanate. 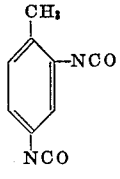 | N,N'-(4-methyl-m-phenylene)bis[1-piperidinecarboxamide]. 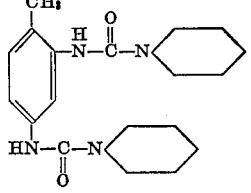 |

TABLE I—Continued

| Example | Amine Reactant, pts. by wgt. | Isocyanate Reactant, pts. by wgt. | Yields, percent | Nitrogen, percent | |
|---|---|---|---|---|---|
| | | | | Calc'd | Found |
| III | 16 | 17.4 | 95 | 18.1 | 18.0 |
| IV | 10.0 | 25.0 | 90 | 16.5 | 16.4 |
| V | 10.0 | 16.0 | 99.8 | 22.4 | 22.3 |
| VI | 10.0 | 29.6 | 93 | 14.5 | 14.5 |
| VII | 10.0 | 26.4 | 95 | 15.8 | 15.5 |
| VIII | 9.5 | 17.4 | 90 | 21.6 | 21.6 |
| IX | 18.7 | 17.4 | 95 | 16.3 | 16.3 |

FORMULATION AND EVALUATION OF ADHESIVE COMPOSITIONS

To samples of 10 parts of a commercially available bisphenol A-epichlorohydrin thermosetting epoxy resinous condensate having a viscosity (measured at 25° C.) of 100–160 poises and an epoxide equivalent (grams of resin containing one gram equivalent of epoxide) of 175–210 was added 1 part by weight of several of the curing agents prepared in the preceding examples. The samples were each cured at 107° C. for 90 minutes. The curing rate and efficiency of cure was measured by the decrease in epoxy content in each sample as measured by means of infrared spectrometry. The stability of the samples is also observed and the pertinent data recorded. All of this data is set out in tabulated form in the following Table II below:

TABLE II

| Ex. | Curing Agent | Comparative Cure Results (90 min. cure at 107° C.) | |
|---|---|---|---|
| | | Percent of Epoxide Condensation | A—Bondability B—Stability |
| I | 1,1'(4-methyl-m-phenylene)-bis[3,3-dimethylurea]. | 91 | A—excellent. B— month or more (excellent). |
| II | 80/20 mixture of 2,4 and 2,6 isomers of compound of Example I. | 94 | A—Excellent. B—1 month or more (excellent). |
| III* | 1,1'(4-methyl-m-phenylene)-bis[3,3-diethylurea]. | 16 | A—Failure. B—Satisfactory. |
| IV | 1,1'(methylene-p-phenylene) bis [3,3-dimethylurea]. | 91 | A—Excellent. B—1 month or more (excellent). |
| VI* | 1,1'-(3,3'-dimethoxy-4,4' biphenylene) bis [3,3-dimethylurea]. | 44 | A—Failure. B—Satisfactory. |
| VII | 1,1'-(3,3'-dimethyl-4,4'-biphenylene bis [3,3-dimethylurea]. + | 96 | A—Excellent. B—1 month or more (excellent). |
| VIII* | 1,1'-(4-methyl-m-phenylene)-bis [3,3-aziridinyl-urea]. | 20 | A—Failure. B—Satisfactory. |
| IX* | N,N'-(4-methyl-m-phenylene) bis [1-piperidine-carboxamide]. | 50 | A—Failure. B—Satisfactory. |

From the foregoing data, it is obvious that a high degree of unpredictability exists among the various analogues which comprise the broad type of materials within which our novel improved epoxy curing agents have been discovered. For instance, it can be seen that while the curing agent 1,1'(4-methyl-m-phenylene)-bis[3,3-dimethylurea] of Example I has an epoxide conversion at 107° C. of 91 percent its diethyl analogue 1,1'(4-methyl-m-phenylene)-bis[3,3-diethylurea] of comparative Example III has an epoxide conversion of only 16 percent under the exact same conditions of cure. This constitutes a parameter of our invention based on a structure activity relationship.

Moreover, comparing a second member of our claimed class of improved curing agents, i.e., the compound 1,1'-(3,3'-dimethyl - 4,4' - bisphenylene)bis[3,3-dimethylurea] with that of comparative Example VIII, it becomes obvious that the value of R in the generic formula must also have certain unpredictable values to maintain the activity of the curing agent at low temperatures. Since, obviously, the composition of comparative Example VIII is of no value as a low temperature cure adhesive since it only condenses 20 percent of the epoxy groups this material is not only outside the scope of this invention, but proves the value of our discovery of the improved material of Example VII.

We claim:
1. A composition of matter comprising (A) an organic polyepoxide material having a plurality of reactive 1,2-epoxy groups and (B) as a curing agent for said polyepoxide an effective amount of the composition of matter having the structure:

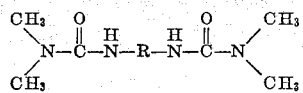

wherein R represents a divalent aromatic radical selected from the group consisting of unsubstituted phenylene, methyl substituted phenylene, dimethyl diphenylene and methylene diphenylene.

2. A composition of matter according to claim 1 wherein the R radical of curing agent component (B) is a methyl substituted phenylene radical.

3. A composition of matter according to claim 2 wherein the R radical of curing agent component (B) is a 4-methyl-m-phenylene radical.

4. A composition of matter according to claim 1 wherein the R radical of curing agent component (B) is a methylene diphenylene radical.

References Cited

UNITED STATES PATENTS 2,876,260   3/1959   Huyser et al. _____ 260—47

WILLIAM H. SHORT, *Primary Examiner.*

T. D. KERWIN, *Assistant Examiner.*

UNITED STATES PATENT OFFICE
CERTIFICATE OF CORRECTION

Patent No. 3,386,955                  June 4, 1968

Aleksandra Chrobok Nawakowski et al.

It is hereby certified that error appears in the above numbered patent requiring correction and that the said Letters Patent should read as corrected below.

Column 5, lines 4 to 19, the formula should appear as shown below:

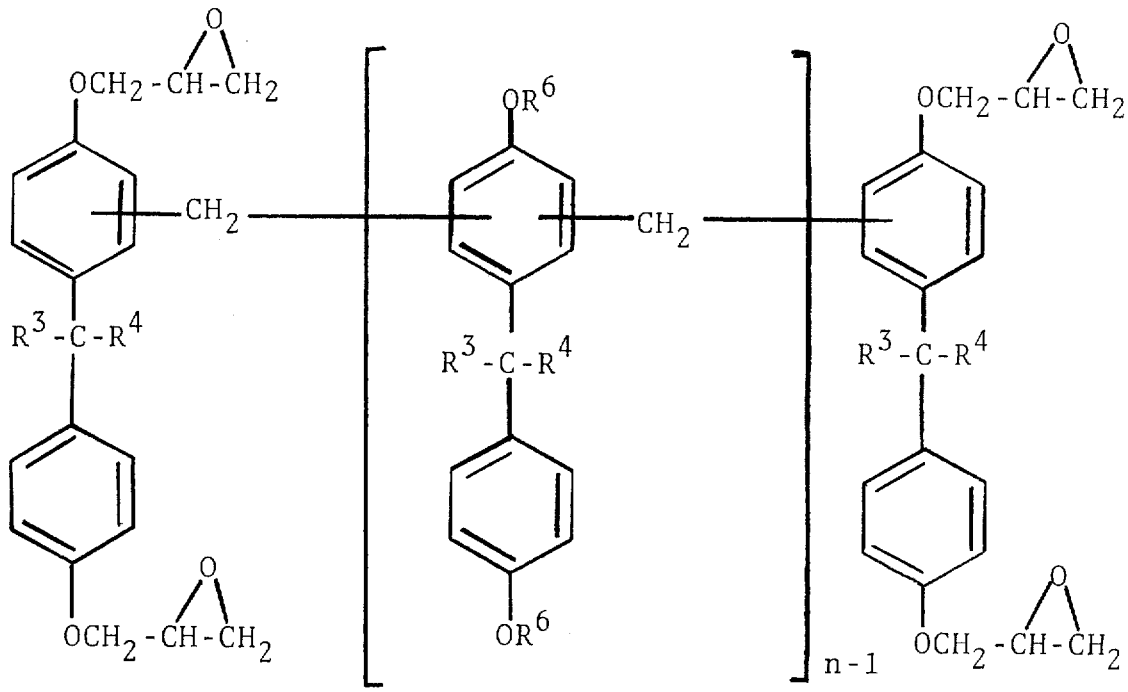

Column 7, line 12, "compisitions" should read -- compositions --. Column 9, TABLE I-Continued, the last column, under the heading "Found" thereof,

| | | |
|---|---|---|
| 18.0 | | 18.4 |
| 16.4 | | 16.3 |
| 22.3 | | 22.5 |
| 14.5 | should read | 14.5 |
| 15.5 | | 15.6 |
| 21.6 | | 21.3 |
| 16.3 | | 16.0 |

3,386,955

(2)

Column 10, TABLE II, third column, line 2 thereof, "B-month" should read -- B-1 month --.

Signed and sealed this 11th day of November 1969.

(SEAL)
Attest:

EDWARD M. FLETCHER, JR.
Attesting Officer

WILLIAM E. SCHUYLER, JR.
Commissioner of Patents